United States Patent [19]
Zvanut

[11] 3,848,109

[45] Nov. 12, 1974

[54] ARC WELDING PROCESS AND ELECTRODE FOR STAINLESS STEEL

[75] Inventor: Albert J. Zvanut, Whittier, Calif.

[73] Assignee: Stoody Company, Santa Fe Springs, Calif.

[22] Filed: Feb. 26, 1973

[21] Appl. No.: 335,977

Related U.S. Application Data

[60] Continuation of Ser. No. 119,642, March 1, 1971, abandoned, which is a division of Ser. No. 879,045, Nov. 24, 1969, Pat. No. 3,585,352, which is a continuation-in-part of Ser. No. 777,405, Nov. 20, 1968, abandoned.

[52] U.S. Cl............................ 219/146, 117/202
[51] Int. Cl............................................ B23k 35/22
[58] Field of Search....... 219/73, 74, 137, 145, 146; 117/202-207

[56] References Cited
UNITED STATES PATENTS

| 3,023,130 | 2/1962 | Wasserman et al................. 219/146 |
| 3,466,417 | 9/1969 | Chapman et al.................... 219/146 |

Primary Examiner—J. V. Truhe
Assistant Examiner—G. R. Peterson
Attorney, Agent, or Firm—Nilsson, Robbins, Bissell, Dalgarn & Berliner

[57] ABSTRACT

There is disclosed an arc welding process for stainless steel and a flux-cored electrode particularly useful therein. In one embodiment, means are provided for limiting the moisture content of the electrode as applied to the work piece. In another embodiment the electrode is formulated of components having relatively low moisture absorptivity.

3 Claims, 4 Drawing Figures

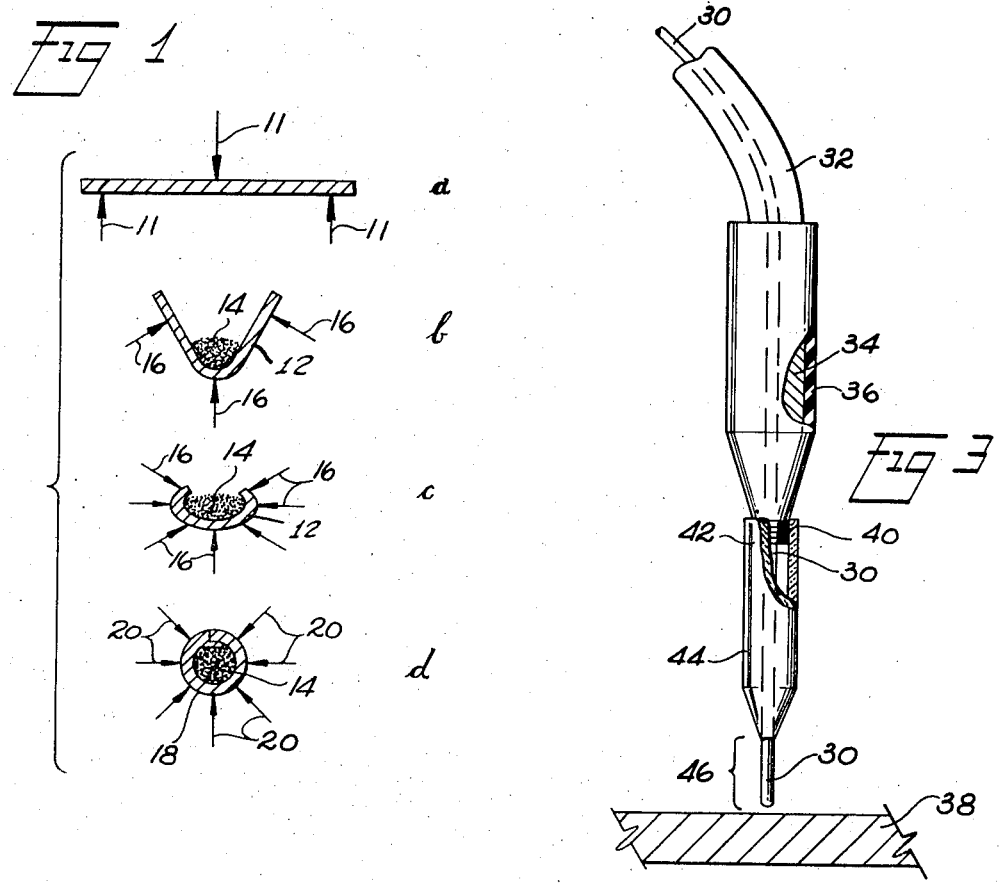
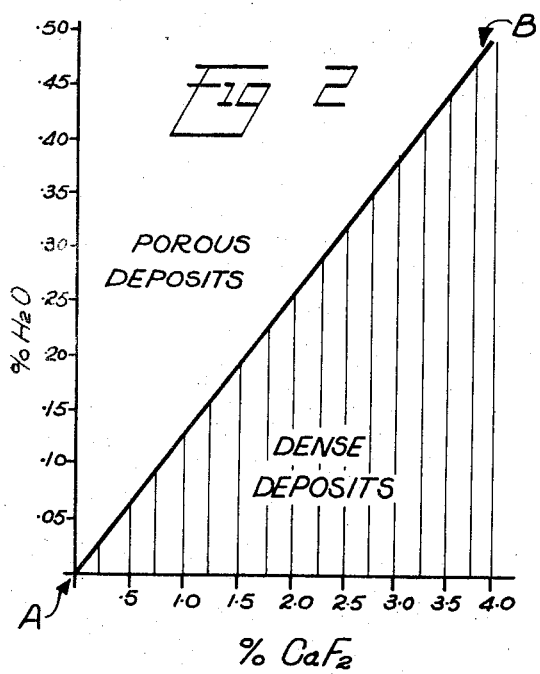
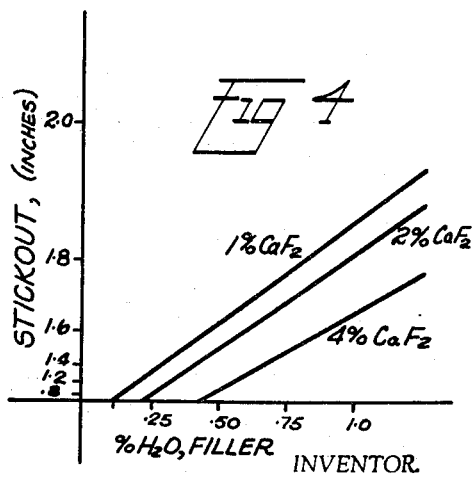

ARC WELDING PROCESS AND ELECTRODE FOR STAINLESS STEEL

CROSS REFERENCE TO RELATED APPLICATION

This application is a continuation of application Ser. No. 119,642, filed Mar. 1, 1971, now abandoned which in turn is division of application Ser. No. 879,045 filed Nov. 24, 1969, now U.S. Pat. No. 3,585,352, which in turn is a continuation-in-part of application Ser. No. 777,405 filed Nov. 20, 1968, now abandoned, entitled ARC WELDING ELECTRODE.

FIELD OF THE INVENTION

The field of art to which the invention pertains includes the field of arc welding electrodes.

BACKGROUND AND SUMMARY OF THE INVENTION

Flux-cored electrodes have been utilized in the arc welding of steel for continuous or automatic feeding of the electrode to the work piece. Generally mild steel or low carbon steel (both more accurately termed plain steel) in tubular form is filled with a mixture of fluxing and slag forming agents and deoxidizers to protect the weld against oxidation. Such "bare" electrodes permit direct electrical contact and, as the electrode is melted by the arc, the mixture of materials constituting the core function much in the same manner as if they were coated on the electrode or separately deposited. However, since the bare steel is exposed to the effects of the atmosphere, protective gases are invariably utilized to obtain a clean weld. Such gases as helium and argon are commonly utilized and bulky and expensive gas metering equipment is required; yet, arc welding with such electrodes in the absence of a protective gas cover results in pitted and rough welds, embrittled by entrapped oxides.

Prior attempts have been made to formulate bare electrodes that could be utilized in air, i.e., without the use of an inert gas or auxiliary covering, as exemplified by the disclosures of U.S. Pat. Nos. 2,909,650 and 2,909,778. These methods have incorporated deoxidizers (including "killing agents") along with the alloying metals and have included a fluxing agent, as "protector" for the more reactive deoxidizers, and a slag former as an oxide solvent. Typically, sufficient silicon dioxide is utilized to impart acidic properties to the slag. While these disclosures have added to the art, their techniques are not entirely satisfactory when applied to the welding of stainless steel.

It is not desired to limit the present invention to any particular theory since the chemistry and physics of welding are very complex; nevertheless some of the reasoning behind development of the present invention will help to indicate why the prior art has failed to develop adequate means for arc welding stainless steel in air with a flux-cored electrode. Perhaps one of the major reasons for this failure of development is that the prior art has not appreciated that there are very significant and critical differences between the chemistry of welding plain steel and the chemistry of welding stainless steel. For example, the art has theorized that one of the major reasons for weld porosity is the release of nitrogen gas, carried into the molten weld in the form of a nitride of a metal and formed upon reaction of the metal with the surface iron oxide. This explanation of porosity is quite satisfactory with plain steel welding in view of the relatively low solubility of nitrogen gas in plain molten steel. Accordingly, to "cure" this problem, the prior art adds a metal which forms a nitride of sufficient size as to sink into the molten weld pool where the amount of iron oxide present is less than on the surface, thereby avoiding the formation of nitrogen gas. However, when the same procedures are applied to the welding of stainless steel in which porosity is a problem, they are not successful, and it may be theorized that nitrogen gas is not responsible for porosity in stainless steel. The solubility of nitrogen gas, and therefore tolerance for the gas, is apparently much greater in stainless steel than it is in plain steel. Another distinction between stainless and plain steels results simply from the gas generating effect of the high carbon content of plain steel which causes the formation of blowholes.

It can thus be theorized that the reasons for porosity in stainless steel are chemically different than the reasons for porosity in plain steel, and further theorized that the reasons relate to the relative insolubilization of hydrogen during solidification of stainless steel. Thus, hydrogen induced porosity apparently occurs when the residual hydrogen is supplemented by another source which raises the total amount of hydrogen above the solubility limit. When the hydrogen content of the weld exceeds the solubility limit for the conditions of temperature and solidification rate during welding, porosity occurs. This aspect of porosity is also of concern with plain steel, however, the problem is much more severe in stainless steels. In the presence of moisture, chromium apparently accelerates the reactions responsible for porosity. It can also be theorized that a major culprit which donates hydrogen to the weld is moisture. During manufacture, flux-cored electrodes are processed through a baking step which reduces the moisture to low levels. However, upon storage, the moisture content increases to the point where it results in porosity.

The present invention is concerned with providing a process for arc welding of stainless steel, e.g., austenitic without the formation of porous steel welds. Stainless steels containing nickel ranging from 7 to 35 percent are austenitic type. Various novel means are provided for accomplishing this end, which means relate to the use of arc welding electrodes with limited moisture levels. However, it should be clearly understood that the invention as defined hereinafter by the claims is not to be limited or construed with respect to any theory of operation as the mechanisms herebefore and hereafter presented are presented only by way of possible explanation of the results and effects which constitute my discoveries.

In a broad sense, I provide a process comprising providing an arc welding flux-cored electrode which is capable of forming a stainless steel weld of desired composition, electrically energizing the electrode, mechanically feeding the electrode toward the work piece while maintaining an arc between the end of the electrode and work piece, and providing moisture limiting means whereby the electrode is applied to the work piece with a moisture content of less than 1.0 percent based on the weight of the filler.

In one embodiment, the moisture limiting means relates to the composition of the electrode flux and to certain ratios of components of the electrode. Thus, a suitable electrode comprises a hollow tube of steel having as filler on the inside thereof (1) one or more alloying metals in amount sufficient to form a stainless steel weld of desired composition and (2) slag-forming material including a slag-forming first component and a derivative of a metal having an oxide form when molten different from the first component and soluble in the slag. The steel tube has a diameter of 0.045 to 0.30 inches, the weight ratio of the filler to the steel tube being 0.2/1 to 1.5/1 (e.g., filler 17 to 60 percent of total weight) and the weight ratio of the slag-forming material to the alloying material being 0.15/1 to 0.65/1. As a particular means of limiting the moisture content, a fluxing agent such as calcium fluoride, or a fusion or decomposition derivative thereof, is included as a component of the filler in at least an amount, corresponding to the level of moisture content of the filler, as will yield a non-porous weld. As will be illustrated herein further, with respect to a calcium fluoride, this moisture content is defined by the line A–B of FIG. 2 in the accompanying drawing. It may be theorized that the calcium fluoride reacts with water vapor which may be present to form compounds which are not harmful to the weld. Similarly, calcium carbonate can effect the formation of non-harmful compounds upon reaction with water vapor at the weld temperature. However, it may also be theorized that calcium fluoride and calcium carbonate increase the basicity of the slag which reduces hydrogen absorption by the weld metal. To further reduce the effect of moisture, the components of the slag-forming material of the filler are chosen so that this material, or fusion or decomposition derivative thereof, has a relatively low equilibrium moisture content, defined hereinafter as less than 2 weight percent at 70° F. and 90 percent relative humidity. To limit the tendency of the slag-forming material to take up moisture, it may be fused and formed into vitreous particles prior to incorporation into the steel tube. Calcium fluoride or the like may also be added as part of the vitrified slag material and/or in addition thereto.

With respect to specific compositions, the aforementioned derivative of metal has a basic or amphoteric oxide form when molten, different from the first slag-forming component, whereby the combination of the molten oxide form of the metal derivative and the molten form of the first component is basic or amphoteric. In still other particular embodiments, there is incorporated a second derivative of metal having a basic or amphoteric form which is similar in solubility properties to the first derivative of metal mentioned above.

In another embodiment of the invention, the moisture limiting means is provided in the form of an electrically insulative member which supports the electrode in sufficient extension from its conductive holder whereby resistance heating of the electrode reduces the level of any moisture in the electrode, at the point of application to the work piece, to the aforementioned limited moisture content.

In still another embodiment of the invention, the moisture limiting means is effected by packaging the electrode prior to use in material having a water-vapor transmission rate sufficiently low to maintain a level of moisture in the electrode, prior to use, to the aforementioned limited moisture content.

BRIEF DESCRIPTION OF THE DRAWINGS

FIG. 1 is a series of cross-sectional views illustrative of a process of manufacturing welding electrode wire of the present invention;

FIG. 2 is a chart illustrating the relationship of moisture content and calcium fluoride content to porosity of weld deposit;

FIG. 3 is a side elevational view partly in cross section and somewhat diagrammatic showing apparatus embodying an aspect of the invention; and FIG. 4 is a chart showing the relationship of electrode stickout, moisture content and calcium fluoride content to porosity of weld deposit.

DETAILED DESCRIPTION

The manufacture of an arc welding electrode of tubular construction enclosing a core composition of this invention is illustrated in FIG. 1. A flat strip of metal or tape is first prepared, comprising a metal which may be cold formed and which is a desirable component of the finished wire electrode. For example, the strip (FIG. 1a) may comprise mild steel tape fifteen thirty-seconds inch wide and 0.0095 inch thick. The initial step in forming the electrode involves developing the strip, as indicated by the arrows 11, into an elongate trough 12 (FIG. 1b) utilizing any of a variety of known techniques. After formation of the trough 12, a quantity of filler 14 of this invention, the composition of which will be described below, is dispensed into the length of the trough 12 by a continuous-feed process. Subsequently, the trough 12 is compressibly closed as indicated by the arrows 16 (FIGS. 1b and 1c) until the original strip comprises a closed cylindrical tube 13 (FIG. 1d). The metal-working formation of the strip into a closed tube 18 with the filler 14 therein may be performed in production, for example, as disclosed in U.S. Pat. Nos. 1,629,748 and 1,640,859, issued to W. F. Stoody.

As depicted in FIG. 1d, subsequent to the formation of the closed tube 18, additional radial (rolling applied) compressive forces are applied as indicated by the arrows 20 to thereby closely compact the filler 14 within the tube. This action reduces the diameter of the tube 18 to accomplish electrode wire of the desired size, intimately mates the components together and may reduce some of the particles. In this regard, reference can be made to application Ser. No. 724,917, now U.S. Pat. No. 3,534,390, filed Apr. 29, 1968, by M. D. Woods and A. J. Zvanut and entitled "Welding Wire and Method of Manufacture," which notes that the combination of the foregoing manufacturing steps and the utilization of filler 14 of particles below a critical size, coupled with the employment of compressive radially-applied rolling forces on the preformed tube enable the accomplishment of welding electrode wires having a diameter of one-sixteenth inch or even smaller.

In accomplishing such small diameter continuous electrode, the ingredients (excepting the mild steel strip), particularly the alloying metals, should be reduced to particles which would pass a 60 mesh screen. In formualting electrode wire of very small diameter, e.g., one-sixteenth inch, it would be preferred to reduce the particles so that they would pass a 150 mesh screen, more preferably a 200 mesh screen, and the number of particles which would then pass a 325 mesh screen should be reduced to 25 percent of the total weight of the filler 14. The resultant mixture can then be compacted, baked and then crushed to 20 mesh for tube loading.

In the foregoing manner, electrode wire having a diameter of 0.045 to 0.30 inches may be accomplished economically in a continuous production operation and containing a weight ratio of filler to tube of 0.2/1 to 1.5/1. As will be brought out hereinafter, by utilizing such diameter wire and filler ratio and a weight ratio of slag-forming material to alloying metal of 1.5/1 to 0.65/1, an electrode which is partidularly suitable for the welding of stainless steel is thereby produced. I have further found that in order to accomplish an arc welding electrode suitable for satisfactory welding of stainless steel, the electrode filler 14 should comprise (1) one or more alloying metals in amount sufficient to form a stainless steel weld of desired composition and (2) slag-forming material including a slag-forming first component and a derivative of a metal having an oxide form when molten different from the first component and soluble in the slag.

With respect to the alloying metals, their nature depends, of course, on the composition of the sheet metal utilized to form the electrode and the desired weld composition. The term "plain steel" is generically descriptive of a variety of steels ranging from low-carbon or mild-steel (typically 0.005 to 0.15 percent carbon content) to high-carbon steel (up to 1.0 percent carbon content) and any of such steels can be utilized as the steel strip. The compositions of this invention are formulated to obtain a stainless steel weld; accordingly, the alloying metals comprise at least 10 weight percent chromium. Other alloying metals include aluminum, molybdenum, nickel, titanium, tungsten, vanadium, zirconium, manganese, columbium, silicon, ferro alloys such as ferrochromium, ferrosilicon, ferrocolumbium, ferromanganese, ferromolybdenum, and the like, or any other alloying element or combination thereof added to impart a desired alloying effect to the stainless steel.

With regard to the slag-forming first component, such materials are well known to the art, such as titanium dioxide (e.g., in the form of rutile, or other natural form), alumina, silicon dioxide (e.g., in the form of silica flour, feldspar, wollastonite, and the like), manganese dioxide, mixtures of metal oxides, such as asbestos, and the like. Titanium dioxide is a particularly effective slag former. Other slag-formers are known such as potassium titanate and may be utilized in the broadest sense of this invention wherein steps are taken to provide means for limiting the level of moisture in the electrode. However, as will be discussed in greater detail hereinafter, considerations relating to moisture absorption or adsorption may eliminate potassium titanate as a candidate. Sufficient total slag-former should be present to adequately cover the weld, generally from about 0.5 weight percent of the electrode as a minimum for the slag-former per se, up to about 15 weight percent total of slag-former and slag soluble materials as hereinafter described.

With regard to the "derivative of metal" as hereinbefore mentioned, such material is chosen as has a basic or amphoteric oxide form when molten, which molten oxide form is soluble in the slag obtained during welding. One or more such "derivatives" may be utilized. Since the molten oxide forms of these derivatives are soluble in the slag, they should be chosen so as to not increase the density of the slag beyond that of the weld metal and also should be such, and be present in such amounts, as to impart to the combination of slag forming metal oxide and other slag-soluble components, at the temperature of weld formation, a freezing temperature no higher than the freezing temperature of the weld. In addition to melting point and density properties, viscosity and surface tension of the slag are also of prime importance, (it is generally desired to have a slag of high viscosity and low surface tension). Accordingly, these factors should be balanced when blending the filler, and a combination of derivatives should be utilized which impart such characteristics or which allow such characteristics to be imparted by the addition of other agents.

The derivatives are preferably such as to yield basic or amphoteric oxides when molten, in contrast to the commonly used acidic oxide ingredients of the prior art, and are such that their molten combination with the slag-forming metal oxide and fluxing agent results in a basic or amphoteric slag. The terms "acidic," "basic" and "amphoteric" are well known to those in the welding art; the classification can be made by noting any tendency on the part of the material to react with a strongly basic material like lime (in which case it would be acidic), or a decidedly acidic material like silica (in which case it would be basic or alkaline), or both in the case of amphoteric oxides. Generally the non-metals form acidic oxides and the metals form basic oxides (but particular members of Group IV and higher of the periodic table will often have basic, intermediate and acidic oxides, acidic character generally increasing with the oxygen/metal ratio). It may also be advantageous to utilize a metal that is less "noble" than iron, i.e., that are more electro-positive than iron, to avoid any tendency of the derivative to oxidize iron.

With the foregoing parameters in mind, materials useful as derivatives can be chosen from such compounds as zinc oxide, barium oxide, calcium oxide, calcium carbonate, magnesium oxide, magnesium carbonate, cobalt (III) oxide, calcium oxalate, strontium oxide, titanium dioxide, manganese dioxide, potassium oxalate, lithium carbonate, zirconium carbonate, zirconium dioxide, gallium sesquioxide, and the like. Some of the foregoing derivatives were described above as slag formers. In this regard the derivative chosen should be such as to be different from any slag-former utilized in the composition. Particularly effective results have been achieved with manganese dioxide as the sole derivative or in combination with zirconium dioxide or calcium carbonate. The amount of derivative suitably added is governed by factors already considered above, but generally from about 0.1 to about 3 weight percent, based on the electrode of each such material can be added.

In addition to the foregoing components, there may also be added as part of the filler a deoxidizer and a fluxing agent. With regard to the deoxidizer, this is added to dispose of oxygen or oxygen-bearing compounds in the molten weld, or to remain in the metal as a safeguard in the event that oxygen should enter. Accordingly, the deoxidizer is a metal having a greater affinity for oxygen than does iron so as to preferentially oxidize to thereby reduce iron oxide to iron. More than one deoxidizing metal may be present. Thus, the term "deoxidizers" as utilized herein includes also metals otherwise termed "killing agents." One can utilize such metals as chromium, tantalum, niobium, gallium, aluminum, silicon, calcium, lanthanum, manganese, vanadium, zirconium, beryllium, titanium, boron, barium, magnesium, strontium, lithium, actinium, and the like or alloys thereof such as ferrosilicon, ferrochromium, feromanganese, and the like. It will be recognized that some of the foregoing deoxidizers were listed under alloying metals and, indeed, the same material can be utilized both as an alloying metal and deoxidizer, in which case sufficient metal in excess of the amount required for deoxidizing purposes should be added to accomplish the alloying function thereof. Silicon, as such, or as a ferrosilicon is commonly utilized as a deoxidizer but the art has generally limited its inclusion to less than about 1 weight percent. In contrast, with the ingredients utilized for the filler 14 in accordance with this invention, particularly effective results are obtained utilizing effective (with regard to alloys such as ferrosilicon amounts of silicon in excess of 1 percent, a particularly useful range being from about 1.1 to about 2 weight percent silicon. Lower amounts will still produce a very satisfactory result, albeit not as dramatic as the results obtained when the amount utilized is in the higher range. With regard to the amount of deoxidizer in general, from about 0.5 to about 2 weight percent of the electrode is generally satisfactory.

It should be noted that the high alloy content of stainless steel wires utilized in this invention can allow one to omit the use of elements, such as silicon, for de-oxidation on purposes, since the high amount of chromium in stainless steel effects de-oxidation.

With regard to the fluxing agent, such materials are utilized to dissolve oxides formed during welding and it is in this function that the term "flux" is utilized here. The term "flux" has been utilized by the prior art to also indicate the function of mixing or co-mingling with an oxide to form a slag of more favorable melting point and viscosity; however, it is difficult in this respect to make a sharp distinction between shielding slags and fluxes, and for this reason the first-above meaning will be utilized. A wide variety of fluxing agents are known to the art, for example, calcium carbonate, calcium oxide (e.g., a calcined limestone), calcium fluoride, (e.g., as fluorspar) and sodium oxide (e.g., as such, or as derived in situ from sodium carbonate or sodium silicate), and the like.

Further with respect to the nature of the components utilized herein, unless otherwise indicated, the materials are added in the form mentioned, but during processing may well be converted to another form in view of the conditions of processing. Also, it is advantageous to utilize only those components which at least in their finally processed form absorb or adsorb relatively low levels of moisture. Most of the slag-forming components of the filler are hygroscopic to some extent, but I have found that the level of moisture picked up by some components is quite a bit less than the level picked up by other components and that under certain test criteria, the distinction between suitable and nonsuitable components can be demarcated. Specifically I have found that when various slag-forming materials are subjected to 90 percent relative humidity at 70° F. for a time sufficient to establish an equilibrium moisture content, those materials having an equilibrium moisture content of less than 2.0 weight percent yield satisfactory non-porous weld deposits, while those slag-forming materials having an equilibrium moisture content above 2 percent tend to yield porous weld deposits. Accordingly, it is preferred that each component chosen for the slag-forming material have an equilibrium moisture content under the aforementioned conditions of less than 2.0 weight percent, but satisfactory results are obtained if the resultant fully processed composition has that moisture level. The following example illustrates a method whereby the equilibrium moisture content for a variety of materials can be determined.

EXAMPLE 1

Approximately 7 grams of each of the materials listed were transferred as samples into pre-weighed aluminum dishes. The aluminum dishes were placed in an oven operating at 600° F., (1,800° F., as indicated) to drive off moisture content, and were removed, cooled and weighed at hourly intervals until a constant weight was reached (approximately 5 hours were needed). The aluminum dishes were then placed in a humidity chamber at 70° F. under 90 percent relative humidity and then weighed at 24 hour intervals until a maximum was reached or until 216 hours (which, experience has indicated, will indicate whether a material is suitable under the criteria set forth above). The moisture pick-up of the sample was then calculated from the weight gain. The following results were obtained for a variety of materials.

| Material | % Moisture Pick-Up | |
|---|---|---|
| zirconium silicate | 0.04 | |
| rutile | 0.06 | |
| calcium fluoride | 0.07 | |
| potassium silicofluoride | 0.07 | |
| mineralite | 0.19 | |
| feldspar | 0.20 | |
| *manganese dioxide | 0.35 | |
| zirconium dioxide | 0.58 | |
| clay | 0.99 | |
| *potassium titanate | 8.22 | |
| potassium oxalate | 11.6 | |
| bentonite | 15.4 | |
| sodium carbonate | 18.7 | |
| sodium silicate | 163 | (deliquesced) |
| potassium carbonate | 165 | do. |
| potassium fluoride | 254 | do. |

*initial heating at 1,800° F.

Those materials having less than 2 weight percent moisture pick-up under the above conditions are thus readily determined and are particularly suitable as filler components. In addition to the materials listed in the table from zirconium silicate to clay, other suitable materials include potassium oxide, calcium oxide, sodium oxide and sodium silicofluoride. Those components found to pick-up more than about 2 percent moisture should only be used if they are converted during processing of the electrode filler to a material having low moisture pick-up. For example, the carbonates of potassium, sodium and calcium can be used by incorporating one or more of these materials into the filler at such an early stage of processing that they are converted to the respective oxides which are not sufficiently hygroscopic to pick-up excessive amounts of water. This is also true of the oxalates. However, the carbonate or oxalate should not be added at a stage of processing in which it would be in a hygroscopic form, unless such small amounts are used that the total slag-forming material has an equilibrium moisture content, under the indicated conditions, of less than 2.0 weight percent, or other means are provided to insure that the electrode is applied to the work piece with a low moisture content, as hereinafter described with respect to another embodiment of the invention. Besides the listed materials, potassium silicate and some forms of natural clay would be generally unsuitable as components of slag-forming material except under the mollifying conditions just hereinbefore described.

In the event that moisture levels are still inadequate to prevent porosity, additional fluxing agent may be added. I have discovered that these materials impart beneficial effects to electrodes for welding stainless steel which are over and above their function as fluxes. Thus I have found that by incorporating more of such materials in excess of that required for normal fluxing purposes, a higher level of moisture content can be tolerated without producing porous welds. Referring to FIG. 2, this effect is graphically illustrated with respect to calcium fluoride wherein the moisture content of the electrode filler is plotted against the level of calcium fluoride, in weight percent of electrode, required to yield a dense, non-porous deposit. The amount of calcium fluoride shown includes an amount required for its fluxing function as well as its moisture "gettering" function and is an "equivalent" amount. In this regard, the nature of the individual components of the filler can undergo drastic changes in chemical and physical structure during processing of the filler into the electrode, but the "equivalent" amount of calcium fluoride can be calculated from the amount of fluorine which remains which can be attributed to calcium fluoride. The line A–B can be used for other fluxing agents by finding the amount of such agent which is equivalent to calcium fluoride in reacting with water and considering such amount an "equivalent" amount. The levels indicated are, of course, approximate as FIG. 2 is intended to relate to a broad range of electrode flux compositions, but by operating in the region below the line A–B, one would generally obtain dense deposits with electrodes that would otherwise be insuitable for welding stainless steel. Thus, one can readily obtain the benefit of this invention by analyzing the moisture content of his electrode just prior to use to determine the water content as a percentage of the electrode filler. He can then adjust the fluxing agent content to the appropriate levels indicated by the chart in FIG. 2. By way of example, if a particular electrode is found to yield porous deposits but is otherwise suitable for welding stainless steel, the moisture content of the filler can be analyzed and the appropriate calcium fluoride level determined. If the amount of calcium fluoride in the filler is lower than that indicated by the line A–B of FIG. 2, then sufficient calcium fluoride can be added to the filler to correspond with the appropriate level as indicated by FIG. 2. It will then be found that the electrode yields dense, non-porous weld deposits.

Any of the other materials referred to above as fluxing agent can be utilized in place of or in combination with the calcium fluoride, e.g., calcium oxide, sodium oxide, and the like, as known to the art. It is generally desirable to use as a fluxing agent material which does not absorb appreciable levels of water, otherwise the additions may be self-defeating in part. If it is desired to use a particular fluxing agent which is known as such, but which absorbs high levels of moisture, it may be possible to use such agent by incorporating it at an early stage of preparation of the filler if processing of the filler results in a change in form of the fluxing agent so as to decrease its hygroscopic properties.

As a further means for limiting the moisture content of the electrode, I have found that it is advantageous to fuse the slag-forming materials into vitreous particles prior to combination with the alloying metals. Thus, the raw slag and flux materials are formulated to achieve a desired theoretical melted composition after which the mixture is smelted in a continuous furnace. When a batch has achieved the desired molten state, it is water quenched, which operation yields a course granulated frit. The frit is then dried, ground and screened to the desired sizing as hereinbefore set forth. The alloying metals are then added and the mixture is formed into electrode wire in a manner previously described with respect to FIG. 1.

The following examples will illustrate these aspects of the invention.

EXAMPLE 2

An arc welding electrode was formed as hereinbefore described with respect to FIG. 1, utilizing the following components, in percent by weight.

| Component | % of Electrode | % of Slag Mix |
|---|---|---|
| Chromium | 20.0 | |
| Nickel | 10.0 | |
| Manganese | 1.5 | |
| Ferrosilicon (85% Si) | 1.5 | |
| Rutile | 5.0 | 66.7 |
| Manganese dioxide | 1.0 | 13.3 |
| Calcium fluoride | 1.0 | 13.3 |
| Zirconium dioxide | 0.5 | 6.7 |
| Mild steel strip | 59.5 | |

In accomplishing a continuous electrode from the above components, the ingredients (except the mild steel strip) were reduced, compacted and crushed as above. Subsequently, the ingredients were used as the filler material in conjunction with the mild steel strip which was cold formed into a containing tube. The structure was then compressibly reduced to one-sixteenth inch diameter by rolling forces.

Another continuous electrode was made with the above components by merely grinding the ingredients, other than the steel strip, to a fine powder, thoroughly intermixing, and used as a filler material in conjunction with the mild steel strip which was cold formed into a containing tube of three thirty-seconds inch diameter.

Each of the above electrodes were tested in welding applications involving an inert gas (argon) treatment. Both electrodes were found to provide very satisfactory fillet welds on stainless steel that were generally smooth and clean with very little splatter and with a well formed, easily removably slag. The weld formed with the one-sixteenth inch diameter electrode was somewhat superior in these characteristics.

Similar experiments were conducted in air, i.e., without the use of an inert gas cover. In both cases, the weld obtained was quite satisfactory, with a generally smooth appearance, only a small amount of splatter and a well formed, easily removable slag. Here also, the one-sixteenth inch diameter electrode was somewhat superior in these characteristics. In all cases, the resultant welds were very acceptable and represent a marked advance in the art in that they evidence the ability to completely eliminate the use of an inert gas-cover.

EXAMPLE 3

Arc welding electrodes having one-sixteenth inch and three thirty-seconds inch diameters were prepared as in Example 2, but utilizing the following components in percent by weight.

| Component | % of Electrode | % of Slag Mix |
|---|---|---|
| Chromium | 20.5 | |
| Nickel | 8.8 | |
| Manganese | 1.5 | |
| Ferrosilicon (85% Si) | 1.5 | |
| Rutile | 5.0 | 52.7 |
| Potassium Titanate | 1.0 | 10.5 |
| Zirconium Oxide | 0.5 | 5.3 |
| Calcium Fluoride | 2.0 | 21.0 |
| Manganese Dioxide | 1.0 | 10.5 |
| Mild Steel Strip | 58.2 | |

As previously indicated, the mixture is compacted, baked and crushed prior to tube loading and at that stage the potassium titanate is dehydrated. Immediately after formulation of the electrode wire, experiments were conducted as in Example 2 under argon and in air. In each case, very satisfactory welds were obtained having characteristics similar to those obtained with the electrodes of Example 2.

However, after several months storage, porous weld deposits are obtained when utilizing the electrode of Example 3, but not when utilizing the electrode of Example 2. It can be theorized that these effects are the result of the subsequent absorption or adsorption of water by the potassium titanate in excess of the amount permitted by the concentration of calcium fluoride.

EXAMPLES 4–7

In order to prevent the absorption or adsorption of water into the slag mix, frits were prepared as hereinbefore described by the fusion and formation of the slag mix into vitreous particles. The raw batches formulated to obtain the frits were as follows:

EXAMPLE

| Component | 4 | 5 | 6 | 7 |
|---|---|---|---|---|
| Rutile | 52.0% | 52.1% | 50.0% | 50.1% |
| Fluorspar (CaF$_2$) | 19.5% | 21.1% | 23.1% | 23.1% |
| Manganese Oxide | 12.8% | 11.2% | 11.2% | 11.2% |
| Potassium Carbonate | 7.6% | 7.5% | 7.5% | — |
| Zircon | 4.1% | 4.1% | 4.1% | 4.1% |
| Sodium Carbonate | 4.0% | — | — | — |
| Potassium Silicofluoride | — | 4.0% | 4.0% | — |
| Sodium Silicofluoride | — | — | — | 4.0% |

After weighing, mixing and smelting and foregoing raw batch in a continuous furnace, and after the batch has achieved a molten state, it is water quenched to yield the frit which is dried, ground and screened through a 200 mesh screen, and then further screened as hereinbefore described. Analysis revealed that the frits had the following theoretical formulas:

EXAMPLE

| Component | 4 | 5 | 6 | 7 |
|---|---|---|---|---|
| TiO$_2$ | 52.6 | 52.4 | 50.5 | 50.8 |
| CaO | 14.8 | 15.3 | 16.8 | 16.9 |
| F$_2$-O | 4.3 | 5.3 | 5.7 | 5.9 |
| MnO | 9.5 | 8.4 | 8.4 | 8.5 |
| K$_2$O | 5.2 | 6.9 | 6.9 | — |
| ZrO$_2$ | 3.4 | 3.4 | 3.4 | 3.4 |
| Na$_2$O | 2.8 | 0.4 | 0.4 | 6.3 |
| SiO$_2$ | 5.7 | 6.6 | 6.6 | 6.9 |
| Fe$_2$O$_3$ | 0.8 | 0.8 | 0.7 | 0.8 |
| Others | 0.9 | 0.5 | 0.6 | 0.5 |

Most of the fluorine in the formulation is driven off in the production of the frit. One can only speculate as to the form or state in which the fluorine exists in the glassy frit material. Thus, while the fluorine has been indicated as F$_2$-O, it may actually be retained as a gas or possibly combined with Si as SiF$_4$, or it may be in a state of unstable equilibrium wherein re-heating could result in crystal formation. Fluorine analysis of some of the frits and equivalent calcium fluoride are given below.

| Example | F$_2$,% | Equivalent CaF$_2$, % |
|---|---|---|
| 4 | 0.79 | 1.62 |
| 5 | 1.17 | 2.40 |
| 6 | 1.30 | 2.67 |

Arc welding electrodes having one-sixteenth inch diameter were prepared as in Example 1 but utilizing the following components, in percent by weight.

| Component | % of Electrode |
|---|---|
| Chromium | 20.0 |
| Nickel | 10.0 |
| Manganese | 1.5 |
| Ferrosilicon (85% Si) | 1.5 |
| Frit | 10.5 |
| Mild Steel Strip | 56.5 |

Experiments were conducted in which the electrodes were tested in welding applications in air, without the use of an inert gas, and dense, non-porous welds were obtained which were quite satisfactory in all respects.

When formulating the frit particles together with the alloying metal particles into the hollow steel tube, one may incorporate at that time an additional amount of calcium fluoride or other flux material, as previously discussed, to impart additional protection against moisture. For example, with the formulations of Examples 4–7, one may incorporate 1.0 weight percent of calcium fluoride with the alloying metals and frit to provide a flux cored electrode with very high resistance against the formation of porous welds.

Referring now to FIGS. 3 and 4, another embodiment of this invention is illustrated for limiting the moisture content of the arc welding electrode. As previously indicated, the propensity of an electrode to form porous deposits appears to be related to the amount of moisture present when the electrode is applied to the work piece. The present embodiment allows one to utilize an electrode which initially has water levels which would ordinarily be in excess of those required for a non-porous weld deposit, e.g., lying above the line A–B of FIG. 2. The present embodiment is based upon the fact that an arc welding electrode is heated in proportion to $I^2R$ so that doubling of the length of the exposed electrode results in quadrupling of heat generated. By using such longer, "stickouts" than normal, sufficient preheating of the wire can take place to drive off moisture which would otherwise cause porosity. While it is known to increase the stickout of an electrode to increase the speed of automatic welding (as in U.S. Pat. No. 2,721,249), the art has not appreciated that stickout can be advantageously utilized to decrease porosity of the weld by driving off moisture.

With specific reference to FIG. 3, apparatus is there schematically shown which is adapted to carry out the present embodiment by providing electrode stickout. Thus, there is shown an arc welding electrode 30 being drawn through a flexible tubular guide 32 and from there through an electrically conductive tubular member 34 which is externally encased in an insulative member 36. The electrode 30 is continuously fed from the conductive tubular member 34 to the work piece 38 where the welding operation is carried out and effected by circuitry and welding machine components not shown.

In normal arc welding operation the terminal portion or stickout of the weld rod is about three-fourths inch from the terminal end of the conductive tubular member 34. In the present embodiment, the forward portion 40 of the outer tubular insulative member 36 is formed with threads which are engaged by a correspondingly threaded portion 42 of a tubular insulative member 44. The insulative member 44 can be constructed of any non-conducting material, but is advantageously of a ceramic material which resists expansion upon heating. The insulative member 44 can take any shape and can be connected to the electrode 30 in any manner that is convenient, the particular form illustrated herein being schematic only, and simply for purposes of illustration. As illustrated, there is provided approximately three-fourths inch stickout 46 from the terminal end of the non-conductive member 44, but the effective stickout, that is the length of electrode subject to resistance heating, is determined by a total of the length 46 plus the length of the non-conductive member 44 extending from the forward end of the conductive tubular member 34. By appropriate adjustments in sizing, any degree of stickout can be provided from the standard three-fourths inch, or less, to several inches or more.

Referring specifically to FIG. 4, an idealized graphical representation is shown for illustrative purposes and sets forth illustrations of stickout appropriate to various levels of moisture content and fluxing agent concentration, calculated as calcium fluoride (the amount of calcium fluoride is a percent of the electrode weight, whereas the amount of moisture is a percent of the filler weight). The representation is idealized since the actual relationship between stickout and moisture content would depend upon the nature of the specific components utilized to constitute the electrode. By analytical methods, one can determine the amount of fluxing agent present in terms of effective amounts of calcium fluoride, and can determine the amount of moisture as a percentage of filler in the electrode just prior to use, and with this knowledge, reference can be made to the chart of FIG. 4, or preferably to a chart which is specifically drawn and tailored to the particular electrode composition which would be utilized. By referring to the chart, one can determine the amount of stickout required to obtain a non-porous, dense weld deposit. For example, utilizing a flux-cored electrode containing 2 weight percent calcium fluoride and 0.5 weight percent water, the normal three-fourths inch electrode extension results in a porous weld, whereas by extending the electrode above the line designated 2 percent $CaF_2$, porosity can be avoided. In this particular case, an extension member 44 can be chosen to extend the electrode 1.5 inches or more. The extension should be of a length whereby the level of moisture with respect to the amount of the calcium fluoride (or other fluxing agent or fusion or decomposition derivative, calculated as calcium fluoride) is below the level defined by the line A–B, and this may be determined by analysis of the tip of the resistance-heated electrode.

In still another embodiment of this invention the moisture content of the electrode, as applied to the work piece, is limited by special packaging procedures. Thus the electrode is initially obtained in relatively dry form, i.e., with insufficient moisture therein to cause a porosity problem, and then packaged in such manner that the level of moisture in the electrode prior to use is limited to an amount which would not cause a porosity problem. In accordance with this invention, the electrode is packaged in material having a water-vapor transmission rate sufficiently low to maintain the level of moisture in the electrode prior to use thereof to an amount insufficient to cause porosity of the weld deposit. In terms of FIG. 2, the water-vapor transmission of the package material is sufficiently low whereby the level of moisture with respect to the content of the fluxing agent or fusion or decomposition derivative thereof, calculated as calcium fluoride, is below the level defined by the line A–B. The exact water-vapor transmission rate required depends of course upon the projected length of storage. While it would normally appear that one should merely use a material with an extremely low transmission rate, this may be impractical in view of the highly competitive nature of the electrode wire market. Accordingly, the present invention provides a means for determining at least a minimum package requirement. The particular materials utilized and thickness thereof, of course depends upon the composition of the electrode, but the exact amounts and quantities can be calculated utilizing the procedures and information hereinbefore described. For example, the electrode described in Example 3 can be packaged immediately after formulation in a polyethylene wrapper one thirty-second inch thick and stored for several months without yielding porous weld deposits, whereas without such packaging, porous weld deposits are obtained after several months storage of the electrode.

What is claimed is:

1. A tubular composite self-shielded arc welding electrode comprising a metallic outer sheath and a core within and enclosed by the sheath, the electrode containing chromium and nickel in sum in an amount equal to at least 29.3 weight percent of the weight of the electrode whereby to produce a high-alloy deposit of chromium-nickel stainless steel, the core comprising 16.67 percent to 60 percent of the electrode weight and consisting essentially of the following listed components in the specified weight percentages of the electrode: from about 1 percent to about 7 percent of a slag forming material including a slag-forming first component and a derivative of a metal having an oxide form when molten different from said first component and soluble in the slag, from 1.0–2.67 percent of calcium fluoride, 1.5 percent manganese, from 1.1 to 2 percent silicon, and from 10 to 30 percent of other metal-bearing materials selected from the group consisting of metals, metal alloys and ferroalloys.

2. A tubular composite self-shielded arc welding electrode comprising a metallic outer sheath and a core within and enclosed by the sheath, the electrode containing chromium and nickel in sum in an amount equal to at least 29.3 weight percent of the weight of the electrode whereby to produce a high-alloy deposit of chromium-nickel stainless steel, the core comprising 20 percent to 50 percent to the electrode weight and consisting essentially of the following listed components in the specified weight percentages of the electrode: from about 1 percent to about 5 percent of a slag-forming material, including a slag-forming first component selected from the group consisting of rutile, and wollastinite, and a derivative of a metal having an oxide form when molten different from said first component and soluble in the slag, from 1.0–2.67 percent of calcium fluoride, up to 2.4 percent of a meterial selected from the group consisting of potassium silicofluoride and sodium silicofluoride, 1.5 percent manganese, from 1.1 to 2 percent silicon, add from 10 to 30 percent of other metal-bearing materials selected from the group consisting of metals, metal alloys and ferroalloys.

3. A tubular composite self shielded arc welding electrode as claimed in claim 2 which contains 1.3 percent silicon, 1.5 percent manganese, from 10 to 20.5 percent chromium, from 8.8 to 10 percent nickel, up to about 0.2 percent carbon, balance essentially iron.

* * * * *

Disclaimer 3,848,109.—*Albert J. Zvanut*, Whittier, Calif. ARC WELDING PROCESS AND ELECTRODE FOR STAINLESS STEEL. Patent dated Nov. 12, 1974. Disclaimer filed Oct. 31, 1975, by the assignee, *Stoody Company*.

The term of this patent subsequent to June 15, 1988, has been disclaimed.
[*Official Gazette January 13, 1976.*]

UNITED STATES PATENT OFFICE
CERTIFICATE OF CORRECTION

Patent No. 3,848,109　　　　　　　　Dated November 12, 1974

Inventor(s) Albert J. Zvanut

It is certified that error appears in the above-identified patent and that said Letters Patent are hereby corrected as shown below:

Column 7, line 19, after "ferrosilicon" insert -- ) --.

Column 7, line 30, before "purpose" delete "on".

Column 12, line 64, after "porous" insert -- weld --.

Column 15, line 2, after "material" insert -- fused into vitreous particles --.

Column 16, line 7, "meterial" should read -- material --.

Column 16, line 10, "add" should read -- and --.

Signed and Sealed this

Eleventh Day of January 1977

[SEAL]

Attest:

RUTH C. MASON  
*Attesting Officer*

C. MARSHALL DANN  
*Commissioner of Patents and Trademarks*